US005749214A

United States Patent [19]

Cook

[11] Patent Number: 5,749,214
[45] Date of Patent: May 12, 1998

[54] BRAIDED OR TWISTED LINE

[76] Inventor: Roger B. Cook, 16708 255th Ave., Spirit Lake, Iowa 51360

[21] Appl. No.: 725,995

[22] Filed: Oct. 4, 1996

[51] Int. Cl.$^6$ .................................................. D02J 1/22
[52] U.S. Cl. ................... 57/310; 57/287; 57/290; 87/13; 264/290.5
[58] Field of Search ............... 57/287, 290, 310; 87/13; 28/172.2, 240; 264/290.5, 290.7, 210.7, 210.8

[56] References Cited

U.S. PATENT DOCUMENTS

| | | | |
|---|---|---|---|
| 3,790,995 | 2/1974 | Martin et al. | 28/59.5 |
| 4,112,667 | 9/1978 | Hatcher et al. | |
| 4,436,689 | 3/1984 | Smith et al. | 264/204 |
| 4,455,273 | 6/1984 | Harpell et al. | 264/184 |
| 4,501,856 | 2/1985 | Harpell et al. | 525/240 |
| 4,888,141 | 12/1989 | Bastiaansen et al. | 264/22 |
| 5,035,111 | 7/1991 | Hogenboom et al. | 57/224 |
| 5,176,862 | 1/1993 | Hogenboom et al. | 264/103 |
| 5,202,073 | 4/1993 | Nanri et al. | 264/210.8 |
| 5,205,974 | 4/1993 | Bastiaansen et al. | 264/210.1 |
| 5,340,523 | 8/1994 | Sussman | 264/210.8 |
| 5,342,567 | 8/1994 | Chen et al. | 264/210.8 |
| 5,351,373 | 10/1994 | Ryan | 28/240 |

FOREIGN PATENT DOCUMENTS

| | | |
|---|---|---|
| 1276065 | 6/1986 | Canada. |
| 2028794 | 10/1989 | Canada. |
| 0270707 | 6/1988 | European Pat. Off.. |
| 0310202 | 4/1989 | European Pat. Off.. |
| WO 92/02668 | 2/1992 | European Pat. Off.. |
| 9101006 | 6/1991 | Netherlands. |

*Primary Examiner*—Daniel P. Stodola
*Assistant Examiner*—Tina R. Taylor
*Attorney, Agent, or Firm*—Banner & Witcoff

[57] ABSTRACT

Braided or twisted lines made from gel spun polyolefin yarns are stretched to increase line tenacity. If desired, stretching conditions can also be chosen to significantly reduce the denier of the line.

43 Claims, No Drawings

BRAIDED OR TWISTED LINE

FIELD OF THE INVENTION

The present invention relates to post-braid and post-twist stretching of high tenacity, ultrahigh molecular weight fibers in the form of fishing lines to increase tenacity of the line.

BACKGROUND OF THE TECHNOLOGY

Ultrahigh molecular weight, high tenacity yarn (also referred to as "fiber") based on spun polyolefins are described in numerous patents, published patent applications, and technical articles. Exemplary references include Kavesh et al. U.S. Pat. No. 4,413,110; Smith et al. U.S. Pat. No. 4,344,908; Smith et al. 4,422,993; Kavesh et al. U.S. Pat. No. 4,356,138; Maurer E. P. 55,001; Harpell et al. U.S. Pat. No. 4,455,273; Kavesh et al. U.S. Pat. No. 4,897,902; Neal U.S. Pat. No. 5,277,858; and Kirkland et al. WO 94/00627. The filaments of these yarns are generally made from linear polyethylene or polypropylene chains of a molecular weight of at least 400,000, a tenacity of at least 15 g/denier, a tensile modulus of at least 500 g/denier, a melting point of at least 140° C., have high abrasion resistance, low stretch, high toughness, good dimensional and hydrolytic stability, and high resistance to creep under sustained loads. The yarns made from the filaments are opaque and white in appearance. Such yarns are commercially available from DSM, NV, Netherlands under the name DYNEEMA™ in a variety of deniers and have a significantly higher molecular weight than 400,000.

DYNEEMA filaments are fundamentally made by spinning a polymer solution of ultrahigh molecular weight polyethylene to form gel filaments. The solvent is removed, and the filaments are stretched or "drawn" on one or more stages to form the final fiber (or yarn). In general, such filaments are known in the art as "gel spun polyolefins" with gel spun polyethylene being the most commercially sold.

Numerous applications for the DYNEEMA and other gel spun polyolefin yarns have been developed and created since their introduction. Exemplary products include body armor and other forms of ballistic protection devices, ropes, tire reinforcements and reinforcing materials for a variety of other organic and inorganic composites, and high strength fabrics.

One application of particular interest is in the field of fishing lines. DYNEEMA yarn can be used to make braided fishing lines exhibiting low stretch as well as high toughness. Braiding, however, introduces its own form of vulnerability into the resulting line because the braid strength is generally not the sum or average of either the individual yarn strengths or the individual filament strengths of the multifilament yarn. One explanation is that most braiding equipment does not impart a uniform load to all yarns or filaments in the braid. The braid pattern inherently leaves gaps between the yarns and filaments, and will lay the yarns in a pattern with a particular relative angle. As stress is applied, filaments with the highest as-braided stress will bear substantial load alone until they either fail or elongate sufficiently for the remaining filaments to contribute to the load-bearing burden. With low stretch materials like the gel spun polyolefins, the most stressed filaments will generally break before sufficient elongation has occurred to allow the remaining filaments to substantially bear the stress. The result is a reduced efficiency in the strength of the line or a weakened line (due to broken filaments) after stress.

It would be desirable to have a method for making braided line that would reduce the inefficiencies of the braiding process and produce a stronger line.

SUMMARY OF THE INVENTION

It is an objective of the invention to provide a line and method of making same from ultrahigh molecular weight, high tenacity polyolefin yarn.

It is another objective of the invention to supply a method for increasing the tenacity of a braided or twisted line made of ultrahigh molecular weight, high tenacity polyolefin yarn.

In accordance with this and other objectives of the invention that will become apparent from the description herein, lines according to the invention are made by a process that includes the step of stretching a braided or twisted line of gel spun polyolefin at a temperature within the range from about 130° C. to about 150° C. and at a total draw ratio within the range from about 1% to about 40%.

Braided lines made according to the invention exhibit higher tenacities by prestressing the line under controlled conditions to distribute the load-bearing function more evenly among filaments and yarns in the braid. The result is a braided line in which each individual filament contributes more effectively to the overall strength of the line.

DETAILED DESCRIPTION OF THE INVENTION

Gel spun polyolefin yarns are braided into a line and then subjected to a further controlled tensioning under conditions sufficient to allow rearrangement of the yarns and filaments for more efficient load-bearing. Useful materials for the braiding process include gel spun polyolefins, polyesters, nylons, and aramid yarns. Lines are preferably made from 3–64 yarns of a size within the range from about 20 denier to about 1000 denier. Preferred lines are made of 4–16 yarns, each within a size from about 40 denier to about 400 denier.

The gel spun polyolefin yarns are preferably made of ultrahigh molecular weight, high tenacity polyethylene or polypropylene. Such yarns are characterized by a molecular weight of at least 400,000 and more preferably at least about 800,000, and most preferably at least about one million; a tenacity of at least 15 g/denier; a tensile modulus of at least 500 g/denier; and a melting point of at least 140° C. See, Kavesh et al. U.S. Pat. Nos. 4,413,110 and 4,551,296 the disclosures of which are herein incorporated by reference. Thus, the temperature employed in the present process is within 10° C. of the yarn melting point.

The polyolefin can contain one or more fillers. Exemplary fillers include magnetic materials, electrically conductive substances, substances with high dielectric constant, and mixtures thereof can be used if desired. Specific examples include calcium carbonate, barium carbonate, magnesium carbonate, clay, talcum, mica, feldspar, bentonite, aluminum oxide, magnesium oxide, titanium dioxide, silica, gypsum either uncoated or coated with another material to enhance the bond between the polymer and the filler, e.g., stearic acid or acrylic acid. See, Maurer EP 55,001.

According to the invention, braided lines are placed under tension and stretched sufficiently to increase the tenacity of the braided line by at least about 10%. Preferably, the stretching is performed under conditions sufficient to realize a tenacity improvement of at least 15%, and more preferably a tenacity improvement within the range from about 15–60% relative to the unstretched braided line.

Tenacity is improved by stretching the braided or twisted line at a total draw ratio sufficient to increase the tenacity of the line relative to the original line before stretching according to the invention. Such stretching is performed at a total draw ratio within the range from about 1–100% (i.e., draw ratio of 1.0–2.0), preferably within the range from about 5–50% (draw ratio of 1.05–1.5), more preferably within the range from about 10–40% (draw ratio of 1.1–1.4), and particularly within the range from about 15–35% (draw ratio of 1.15–1.35).

The mechanisms by which the denier reduces is a combination of yarn and filament nesting as well as reductions in the filament denier, depending on the temperature and line tension. Within about 1–5%, the nesting effect seems to predominate. Above about 5%, reductions in the filament denier begin to add to the overall line denier reduction until both operate together to produce further reductions in line denier. Generally, within the lower ratios of the useful range (e.g., about 1–15%), the tenacity improvement is generally characterized by an overall reduction in the elasticity of the braided or twisted structure due to improved nesting of the filaments within the line and some reduction in the diameter of the line. At higher draw ratios, the filaments are drawn to a finer denier as well as better nested with the net effect of further reductions in the denier of the yarn as well as the braided or twisted line structure made from such yarns. See, published Canadian Patent Application No. 1,276,065. Stretching conditions can be selected to reduce the denier of the line by at least 10%, at least 20%, or more.

Line according to the invention retains the opaque white color characteristic of the virgin yarns. If desired, one or more dyes, pigments or other colorants can be coated onto the line or made to absorb into the line structure to change the line color. Preferred coloring agents include mineral oils containing dyes or pigments as well as ethylene-acrylic acid copolymer.

EXAMPLES

For the examples herein, the following apply:

(1) Each tensile test value is the mean of 15 break tests unless noted.

(2) Unless otherwise noted, the test samples were a braid of two 200 denier and two 100 denier gel spun polyethylene yarns (2×200, 2×100).

(3) Tensile test parameters
   Gage length=10-inch
   Cross-head speed=10-inch/minute
   Strain rate=100%/minute (4) Definitions "Yarn" is a term that is also referred to as fiber, multifilament assembly, or tow.

"Filament" is the smallest unit, e.g., monofilament.

"tpi" stands for "twists/inch"

"Z" is a counterclockwise twist.

"S" is a clockwise twist.

"Z uptwist" is a twisting of individual yarns.

"S ply" is a twisting of Z-twisted yarns together to achieve a balance (refer to a twisted rope).

"Draw Ratio" is the ratio of the output velocity to the input velocity of rollers acting on the line. Unless otherwise limited, the "draw ratio" refers to the total draw ratio experienced by the line or yarn.

"Total Draw Ratio" is calculated as the product of the individual roller draw ratios, Total Draw Ratio= Draw Ratio 1×Draw Ratio 2×Draw Ratio 3

"Denier" is the weight in grams of 9000-meters of material.

"gpd" stands for grams/denier

"Ultim. Elong. (%)" is the percent elongation of a test line at break.

"Ovhnd Knot" is an overhand-knot. This is a poor knot that is not skill dependent and generally used only as a screening test.

"Braid Knot" is a fishing knot originally developed for use with braids. "Palomar Knot" is also a type of knot used in fishing. Both are used by anglers and exhibit strengths that depend on the skill of the angler. Each measured strength is a good indicator of actual performance under fishing conditions.

Examples 1–4

In the following examples, a line was braided into a 30 lb fishing line from two 200 denier yarns and two 100 denier yarns of gel spun polyethylene (2×200, 2×100). This line has an average tenacity of about 23.7±5% grams per denier (gpd). The braided line was then passed through one or more ovens between rollers frictionally engaging the line and rotating at different rates chosen to effect the desired draw ratio on the line between the rollers. All ovens are 10 feet long.

Examples 1–4 illustrate the effect of various draw ratios and oven temperatures. The control value is an average of 75 replications over 5 discrete batches. The results are reported in Table 1.

TABLE 1

|  | Ctrl | Ex. 1 | Ex. 2 | Ex. 3 | Ex. 4 |
| --- | --- | --- | --- | --- | --- |
| Feed Rate (fpm) | — | 10 | 10 | 10 | 10 |
| Oven (degC) | — | 120 | 125 | 130 | 135 |
| Draw Ratio | — | 1.35 | 1.35 | 1.5 | 1.7 |
| Tension (g) | — | 3850 | 3250 | 2850 | 2650 |
| Denier | 656.4 | 514.3 | 509.4 | 504.9 | 411.4 |
| Ultimate Elongation (%) | — | 3.7 | 3.4 | 3.1 | 3.0 |
| Break-load (lb) |  |  |  |  |  |
| Straight Break | 33.9 | 36.6 | 34.4 | 33.5 | 30.5 |
| Ovhnd Knot | — | 11.7 | 12.0 | 12.3 | 12.0 |
| Braid Knot | — | 23.6 | 25.3 | 25.0 | 20.1 |
| Tenacity (g/d) |  |  |  |  |  |
| Straight Break | 23.7 | 32.3 | 30.6 | 30.1 | 33.6 |
| Ovhnd Knot | — | 10.3 | 10.7 | 11.0 | 13.2 |
| Braid Knot | — | 20.8 | 22.5 | 22.5 | 22.2 |

In general, examples 1–4 show that higher temperatures will permit a higher draw ratio with, at a certain point, a simultaneous reduction in denier and increase in tenacity. In addition, the tenacity of the line was increased within the range of about 27–42%.

Examples 5–10

Examples 5–10 employed three draw stations with three ovens therebetween. For the single draw in examples 9 and 10, each oven was separated by a gap of 7–10 feet that was exposed to ambient temperature.

TABLE 2

|  | Ex. 5 | Ex. 6 | Ex. 7 | Ex. 8 | Ex. 9 | Ex. 10 |
| --- | --- | --- | --- | --- | --- | --- |
| Feed Rate (fpm) | 10 | 10 | 10 | 10 | 10 | 10 |
| Oven 1 (degC) | 120 | 120 | 120 | 130 | 130 | 135 |
| Oven 2 | 128 | 128 | 133 | 133 | 138 | 143 |
| Oven 3 | 124 | 124 | 134 | 124 | 134 | 139 |
| Draw Ratio 1 | 1.2 | 1.3 | 1.2 | 1.2 | — | — |
| Draw Ratio 2 | 1.2 | 1.15 | 1.2 | 1.2 | — | — |
| Draw Ratio 3 | 1.2 | 1.15 | 1.2 | 1.2 | 1.8 | 2.0[1] |
| Total Draw Ratio | 1.73 | 1.72 | 1.73 | 1.73 | 1.8 | 2.0 |
| Tension 1 (g) | 3050 | 3800 | 3300 | 2380 | 1930 | 1500 |
| Tension 2 | 2950 | 2650 | 2300 | 2350 | 2120 | 1730 |

TABLE 2-continued

|  | Ex. 5 | Ex. 6 | Ex. 7 | Ex. 8 | Ex. 9 | Ex. 10 |
|---|---|---|---|---|---|---|
| Tension 3 | 3050 | 2900 | 2000 | 2750 | 2750 | 1660 |
| Denier | 392.2 | 379.7 | 381.4 | 384.8 | 369.1 | 320.4 |
| Ultim. Elong. (%) | 3.0 | 2.7 | 2.9 | 2.9 | 2.9 | 2.8 |
| Break-load (lb) |  |  |  |  |  |  |
| Straight Break | 29.4 | 27.6 | 29.5 | 27.4 | 27.9 | 25.4 |
| Ovhnd Knot | 12.0 | 12.1 | 10.1 | 11.6 | 10.0 | 8.5 |
| Braid knot | 20.6 | 20.8 | 19.5 | 21.6 | 20.0 | 17.3 |
| Tenacity (g/d) |  |  |  |  |  |  |
| Straight Break | 34.0 | 33.0 | 35.1 | 32.3 | 34.3 | 36.0 |
| Ovhnd Knot | 13.9 | 14.4 | 12.0 | 13.7 | 12.3 | 12.0 |
| Braid Knot | 23.8 | 24.8 | 23.2 | 25.5 | 24.6 | 24.5 |

[1] One draw step through three ovens placed end-to-end.

Examples 5-10 show that it is the total draw ratio that affects line tenacity and that higher temperatures permit higher draw ratios to be employed.

Examples 11-14

In examples 11-14, the feed rate of the line was increased to reduce the residence time in the ovens. The oven temperatures were increased to allow the higher feed rates to be used.

TABLE 3

|  | Ex. 11 | Ex. 12 | Ex. 13 | Ex. 14 |
|---|---|---|---|---|
| Rate (fpm) | 20 | 25 | 25 | 30 |
| Oven 1 (degC) | 140 | 140 | 140 | 140 |
| Oven 2 | 148 | — | 148 | 148 |
| Oven 3 | 144 | — | 144 | 144 |
| Draw Ratio 1 | One draw | 1.35 | 1.35 | 1.3 |
| Draw Ratio 2 | thru 3 ovens | — | 1.30 | 1.3 |
| Draw Ratio 3 | 2.0 | — | 1.15 | 1.1 |
| Total Draw Ratio | 2.0 | 1.35 | 2.02 | 1.86 |
| Tension 1 (g) | — | 2330 | 2400 | 2423 |
| Tension 2 | — | — | 1700 | 1767 |
| Tension 3 | 1650 | — | 1400 | 1264 |
| Denier | 320.9 | 510.8 | 316.4 | 346.9 |
| Ultim. Elong. (%) | 2.8 | 3.0 | 2.6 | 2.8 |
| Break-load (lb) |  |  |  |  |
| Straight Break | 24.7 | 33.8 | 23.1 | 25.6 |
| Ovhnd Knot | 8.6 | 10.7 | 6.5 | 7.0 |
| Braid Knot | 15.7 | 23.1 | 16.8 | 17.4 |
| Tenacity (gpd) |  |  |  |  |
| Straight Break | 34.9 | 30.0 | 33.1 | 33.5 |
| Ovhnd Knot | 12.2 | 9.5 | 9.3 | 9.2 |
| Braid Knot | 22.2 | 20.5 | 24.1 | 22.8 |
| Comment | semi-fused |  |  | semi-fused |

In general, a faster feed rate and lower residence times in the oven resulted in lines with somewhat lower tenacity, although within experimental variation, at the same overall draw ratio. The higher feed rates do, however, enable a higher rate of production.

Examples 15-19

In examples 15-19, the feed rate was reduced to double the residence time in the ovens. Table 4 has the results.

TABLE 4

|  | Ex. 15 | Ex. 16 | Ex. 17 | Ex. 18 | Ex. 19 |
|---|---|---|---|---|---|
| Rate (fpm) | 10 | 10 | 5 | 5 | 10 |
| Oven 1 (degC) | 140 | 140 | 140 | 140 | 120 |
| Oven 2 | — | — | — | — | 138 |
| Oven 3 | — | — | — | — | 144 |
| Draw Ratio 1 | 1.7 | 1.8 | 1.8 | 2.0 | 1.30 |
| Draw Ratio 2 | — | — | — | — | 1.30 |
| Draw Ratio 3 | — | — | — | — | 1.20 |
| Total Draw Ratio | 1.7 | 1.8 | 1.8 | 2.0 | 2.03 |
| Tension 1 (g) | 2077 | 2089 | 1646 | 1750 | 3200 |
| Tension 2 | — | — | — | — | 2100 |
| Tension 3 | — | — | — | — | 1200 |
| Denier | 388.8 | 367.6 | 358.8 | 341 | 329.7 |
| Ultim. Elong. (%) | 3.6 | 3.4 | 3.3 | 2.9 | 3.0 |
| Break-load (lb) |  |  |  |  |  |
| Straight Break | 27.9 | 26.9 | 26.8 | 23.4 | 24.7 |
| Ovhnd Knot | 11.2 | 10.8 | 10.0 | 9.4 | 10.1 |
| Braid Knot | 16.7 | 15.7 | 15.9 | 15.0 | 13.0 |
| Tenacity (gpd) |  |  |  |  |  |
| Straight Break | 32.5 | 33.2 | 33.9 | 32.2 | 34.0 |
| Ovhnd Knot | 13.1 | 13.3 | 12.6 | 12.5 | 13.9 |
| Braid Knot | 19.5 | 19.4 | 20.1 | 20.0 | 17.9 |

By comparing examples 16 and 17, doubling the residence time in the oven permitted some reduction in line denier with comparable tenacity. A single draw at a higher ratio exhibited some reduction in tenacity, but the use of three stages for comparable overall draw ratio resulted in some increase in tenacity and a reduction in line denier.

Example 20

Example 20 is a comparison in the denier reduction from a 35% draw of a braided line made from four 150 denier gel spun polyethylene yarns.

TABLE 5

|  | control | Ex. 20 |
|---|---|---|
| Rate (fpm) | — | 10 |
| Oven 1 (degC) | — | 120 |
| Draw Ratio 1 | — | 1.35 |
| Total Draw Ratio | — | 1.35 |
| Tension 1 (g) | — | 3349 |
| Denier | 553.1 | 478.3 |
| Ultim. Elong. (%) | 4.1 | 4.2 |
| Break-load (lb) |  |  |
| Straight Break | 34.1 | 37.9 |
| Ovhnd Knot | — | 14.8 |
| Braid Knot | — | 23.2 |
| Tenacity (gpd) |  |  |
| Straight Break | 28.0 | 35.9 |
| Ovhnd Knot | — | 14.0 |
| Braid Knot | — | 22.0 |

A draw ratio resulted in a reduction in line denier of about 13.5%. Reducing the line denier will permit a given fishing reel spool to hold more line while providing improved fishing characteristics due to a reduced drag profile in water.

Examples 21-25

Examples 21-25 use a twisted line made from a two ply twist of 100 denier gel spun polyethylene yarns. The use of a twisted structure provides a line with a smaller diameter and lower breaking loads for fishing applications where lines of fine diameter are desirable.

TABLE 6

|  | Ex. 21 | Ex. 22 | Ex. 23 | Ex. 24 | Ex. 25 |
|---|---|---|---|---|---|
| Rate (fpm) | 10 | 10 | 10 | 10 | 0 |
| Oven 1 (degC) | 120 | 140 | 140 | 140 |  |
| Oven 2 | — | — | — | 148 |  |
| Draw Ratio 1 | 1.30 | 1.80 | 2.05 | 1.45 |  |
| Draw Ratio 2 | — | — | — | 1.30 |  |
| Total Draw Ratio | 1.30 | 1.80 | 2.05 | 1.89 |  |
| Tension 1 (g) | 1296 | 725 | 743 | 520 |  |
| Tension 2 | — | — | — | 330 |  |
| Denier | 160.4 | 114.7 | 103.8 | 108 | 212.3 |
| Ultim. Elong. (%) | 3.2 | 2.8 | 2.7 | 2.8 | 3.7 |
| Break-load (lb) |  |  |  |  |  |
| Straight Break | 11.3 | 9.1 | 7.9 | 9.4 | 14.6 |
| Ovhnd Knot | 5.0 | 4.0 | 4.1 | 3.9 |  |
| Braid Knot | 7.9 | 6.6 | 5.6 | 6.1 |  |
| Tenacity (gpd) |  |  |  |  |  |
| Straight Break | 31.9 | 36.0 | 34.5 | 39.5 | 31.2 |
| Ovhnd Knot | 14.1 | 15.8 | 17.9 | 16.4 | — |
| Braid Knot | 22.3 | 26.1 | 24.5 | 25.7 | — |

The benefits of a twisted line are seen from the enhanced tenacities of the line. In braided lines, the braiding process necessarily crosses the yarns at fairly significant relative angles. Even when those relative angles are reduced by a post-braid stretch, the yarns continue to be disposed at fairly significant relative angles in the line.

A twisted line structure presents the yarns more closely approximate to the axis of the line. As a result, the yarns are in a better relative position to contribute their full tensile strength to the line. In addition, the use of a twisted structure eliminates bulk and diameter.

TABLE 7

|  | Control | Ex. 26 |
|---|---|---|
| Denier (gm/9000 m) | 425.7 | 193.7 |
| Diameter (in) | 0.01236 | 0.00690 |
| Break load (lbs) | 21.8 | 14.7 |
| Tenacity (gpd) | 23.25 | 34.45 |
| Elongation (%) | 6.4 | 2.9 |
| Overhand knot (lbs) | 9.4 | 4.9 |
| Overhand Tenacity (gpd) | 10.02 | 11.48 |
| Braid knot (lbs) | 14.3 | 10.5 |
| Braid knot tenacity (gpd) | 15.25 | 24.61 |

Example 27

A braid (4×100 d) of gel spun polyethylene yarns was drawn after braiding with a single oven at 133° C. Input speed was 10 feet/min. Specific draw ratios and results are summarized in Table 8

TABLE 8

|  | Draw Ratio | | | | | |
|---|---|---|---|---|---|---|
|  | control | 1.1 Draw | 1.2 Draw | 1.3 Draw | 1.4 Draw | 1.5 Draw |
| Denier | 421 | 386.3 | 353.4 | 323.6 | 301.5 | 282.4 |
| Diameter (Ave-in) | 0.01182 | 0.01056 | 0.01009 | 0.00966 | 0.0094 | 0.00905 |
| Break (lb) | 26.6 | 31.1 | 29.4 | 28 | 25.1 | 22.2 |
| Tenacity (gpd) | 28.69 | 36.55 | 37.77 | 39.28 | 37.8 | 35.69 |
| Elongation (%) | 5.8 | 4.4 | 4.2 | 3.8 | 3.5 | 3.2 |
| Overhand Knot (lb) | 10.2 | 11.8 | 10.6 | 10.5 | 10 | 9.3 |
| Overhand Tenacity (gpd) | 11.32 | 13.87 | 13.62 | 14.73 | 15.06 | 14.95 |
| Palomar Knot (lb) | 15.4 | 17.7 | 16.4 | 16.5 | 15 | 14.4 |
| Palomar Tenacity (gpd) | 16.61 | 20.8 | 21.07 | 23.15 | 22.59 | 23.15 |
| Tightness (ppi) | 10.5 | 10 | 9 | 8.5 | 8 | 7/5 |

Example 26

A braid of 4×100 d gel spun polyolefin yarns was made and stretched according to the invention. Inspection of Table 7 shows that the braid denier reduced while the tenacity increased.

Examples 28–41

Lines were braided using DYNEEMA SKX8, a gel spun polyethylene yarn. These should represent an increase in strength of the braided line since the yarn is stronger than that used in example 27. These data represent tests on braids prior to any 5 post-braid drawing.

TABLE 9

|  | Ex. 28 | Ex. 29 | Ex. 30 | Ex. 31 | Ex. 32 | Ex. 33 | Ex. 34 |
|---|---|---|---|---|---|---|---|
| Denier (gms/9000 m.) | 313.7 | 426.1 | 436.9 | 639.7 | 665.2 | 778.9 | 856.5 |
| Ave. Diameter (in) | 0.00944 | 0.01140 | 0.01144 | 0.01441 | 0.01413 | 0.01523 | 0.01662 |
| Break Load (lbs) | 19.0 | 28.0 | 26.4 | 35.8 | 31.2 | 33.4 | 47.4 |
| Tenacity (gpd) | 27.50 | 29.83 | 27.43 | 25.41 | 21.29 | 19.47 | 25.13 |
| Elongation (%) | 4.1 | 4.6 | 6.7 | 6.3 | 5.6 | 5.9 | 5.7 |
| Palomar Knot (lbs) | 11.40 | 15.3 | 14.3 | 21.50 | 18.6 | 22.2 | 27.80 |

TABLE 9-continued

|  | Ex. 28 | Ex. 29 | Ex. 30 | Ex. 31 | Ex. 32 | Ex. 33 | Ex. 34 |
|---|---|---|---|---|---|---|---|
| Palomar Knot (gpd) | 16.50 | 16.3 | 14.86 | 15.26 | 12.69 | 12.94 | 14.74 |
| Initial Construction: |  |  |  |  |  |  |  |
| 50 den | 2 | — | — | — | — | — | — |
| 100 den | 2 | 4 | 4 | 2 | 3 | 1 | — |
| 200 den | — | — | — | 2 | 1 | 3 | 4 |
| 400 den | — | — | — | — | — | — | — |
| Tightness (ppi) | 30 | 16 | 16.5 | 15 | 23 | 22 | 15 |

TABLE 10

|  | Ex. 35 | Ex. 36 | Ex. 37 | Ex. 38 | Ex. 39 | Ex. 40 | Ex. 41 |
|---|---|---|---|---|---|---|---|
| Denier (gms/9000 m) | 1723.4 | 1848.1 | 2654.1 | 2621.5 | 3660.2 | 448.9 | 581.1 |
| Ave. Diameter (in) | 0.02466 | 0.02411 | 0.03000 | 0.02911 | 0.03473 | 0.01114 | 0.01266 |
| Break Load (lbs) | 94.2 | 85.2 | 111.2 | 101.0 | 153.8 | 20.6 | 22.9 |
| Tenacity (gpd) | 24.82 | 20.93 | 19.02 | 17.49 | 19.08 | 20.83 | 17.89 |
| Elongation (%) | 10.3 | 5.40 | 8.9 | 11.8 | 14.7 | 4.8 | 5.7 |
| Palomar Knot (lbs) | 52.80 | 55.5 | 67.9 | 71.6 | 100.5 | 13.3 | 15.8 |
| Palomar Knot (gpd) | 13.91 | 13.63 | 11.61 | 12.40 | 12.47 | 13.45 | 12.34 |
| Initial Construction: |  |  |  |  |  |  |  |
| 50 den | — | — | — | — | — | — | — |
| 100 den | — | — | — | — | — | 4 | 1 |
| 200 den | 8 | — | 4 | — | — | — | 3 |
| 400 den | — | 4 | 4 | 6 | 8 | — | — |
| Tightness (ppi) | 22 | 16 | 22 | 16 | 20 | 29 | 29 |

The braids of examples 28–41 were then stretched under the conditions of the present invention. The result is an unfused, braided line characterized by having high strength and sensitivity. The tightness reported in Tables 11 and 12 is the tightness of the braid after processing according to the invention.

TABLE 11

|  | Ex. 28 | Ex. 29 | Ex. 30 | No. 31 | No. 32 | No. 33 | Ex. 34 | Ex. 35 | Ex 36 |
|---|---|---|---|---|---|---|---|---|---|
| Denier (gms/9000 m.) | 244.3 | 328.0 | 344.7 | 505.6 | 512.2 | 622.1 | 676.6 | 1587.1 | 1639.1 |
| Ave. Diameter (in) | 0.00767 | 0.00927 | 0.00914 | 0.0111 | 0.01130 | 0.01211 | 0.01319 | 0.02083 | 0.02021 |
| Break Load (lbs) | 18.70 | 26.0 | 26.6 | 36.2 | 38.60 | 44.90 | 50.3 | 108.7 | 95.20 |
| Tenacity (gpd) | 34.75 | 35.99 | 35.03 | 36.20 | 34.21 | 32.77 | 33.75 | 31.09 | 26.37 |
| Elongation (%) | 3.20 | 3.40 | 3.40 | 4.30 | 3.30 | 3.60 | 3.40 | 6.40 | 5.40 |
| Palomar Knot (lbs) | 11.20 | 16.1 | 16.0 | 22.30 | 22.80 | 26.70 | 28.90 | 58.60 | 61.60 |
| Palomar Knot (gpd) | 20.81 | 22.28 | 21.07 | 20.02 | 20.21 | 19.49 | 19.39 | 16.76 | 17.06 |
| Initial Construction: |  |  |  |  |  |  |  |  |  |
| 50 den | 2 | — | — | — | — | — | — | — | — |
| 100 den | 2 | 4 | 4 | 2 | 3 | 1 | — | — | — |
| 200 den | — | — | — | 2 | 1 | 3 | 4 | 8 | — |
| 400 den | — | — | — | — | — | — | — | — | 4 |
| Tightness (ppi) | 19–20 | 12 | 14 | 13 | 16.5 | 17 | 13 | 19 | 14 |

TABLE 12

|  | Ex. 37 | Ex. 38 | Ex. 39 | No. 40 | No. 41 |
|---|---|---|---|---|---|
| Denier (gms/9000 m) | 2464.7 | 2602.0 | 3370.2 | 350.9 | 478.4 |
| Average Diameter (in) | 0.02532 | 0.0265 | 0.02931 | 0.00930 | 0.01119 |
| Break Load (lbs) | 142.0 | 133.80 | 172.7 | 27.20 | 35.20 |
| Tenacity (gpd) | 26.16 | 23.35 | 23.26 | 35.19 | 33.40 |
| Elongation (%) | 6.37 | 7.70 | 9.60 | 3.60 | 3.4 |
| Palomar Knot (lbs) | 85.0 | 87.10 | 114.1 | 16.1 | 22.3 |
| Palomar Knot (gpd) | 15.66 | 15.20 | 15.37 | 20.83 | 21.16 |
| Initial Construction: |  |  |  |  |  |
| 50 den | — | — | — | — | — |
| 100 den | — | — | — | 4 | 1 |
| 200 den | 4 | — | — | — | 3 |
| 400 den | 4 | 6 | 8 | — | — |
| Tightness (ppi) | 19.5 | 14 | 19 | 21.5 | 23 |

Example 42

A 2×200, 2×100 braid of gel spun polyethylene was made and tested. The knot values are the average of 30-tests (5/sample for 6 samples). Denier is calculated from the weight of single 6-ft specimens and averaged for 6 samples. Straight-break tests are the average of 75-tests (15/sample for 5 samples).

TABLE 13

|  | Ex. 42 |
|---|---|
| Denier | 652.6 |
| Ultimate Elongation (%) | 4.8 |
| Break-load |  |
| Straight Break (lb) | 33.8 |
| Overhand knot | 12.8 |
| Braid Knot | 24.6 |
| Tenacity |  |
| Straight Break (g/d) | 23.5 |
| Overhand Knot | 8.9 |
| Braid Knot | 17.1 |

Examples 43–45

Braid (2×200, 2×100) with a coating of an ethylene acrylic acid copolymer was processed according to the invention.

TABLE 14

|  | Ex. 43 | Ex. 44 | Ex. 45 |
|---|---|---|---|
| Rate (fpm) | 10 | 10 | 25 |
| Oven 1 (degC) | 120 | 140 | 140 |
| Oven 2 | — | — | 148 |
| Oven 3 | — | — | 144 |
| Draw Ratio 1 | 1.35 | 1.8 | 1.35 |
| Draw Ratio 2 | — | — | 1.30 |
| Draw Ratio 3 | — | — | 1.15 |
| Total Draw Ratio | 1.35 | 1.8 | 2.02 |
| Tension 1 (g) | 3820 | 2101 | 2220 |
| Tension 2 | — | — | 1740 |
| Tension 3 | — | — | 1420 |
| Denier | 516 | 385.8 | 343.5 |
| Ultim. Elong. (%) | 3.2 | 2.8 | 2.6 |
| Break-load (lb) |  |  |  |
| Straight Break | 32.2 | 27.0 | 24.5 |
| Ovhnd Knot | 14.3 | 11.3 | 9.6 |
| Braid Knot | 25.1 | 20.2 | 17.3 |
| Tenacity (gpd) |  |  |  |
| Straight Break | 28.3 | 31.7 | 32.4 |
| Ovhnd Knot | 12.6 | 13.3 | 12.7 |
| Braid Knot | 22.1 | 23.7 | 22.8 |

Examples 46–51

A set of examples was prepared to show the effect of draw ratio and either relaxation or no additional draw in the last draw stage of a three stage draw. The braid was made from 2×200, 2×100.

TABLE 15

|  | Ex. 46 | Ex. 47 | Ex. 48 | Ex. 49 | Ex. 50 | Ex. 51 |
|---|---|---|---|---|---|---|
| Rate (fpm) | 25 | 25 | 25 | 25 | 25 | 25 |
| Oven 1 (degC) | 140 | 140 | 140 | 140 | 140 | 140 |
| Oven 2 | 148 | 148 | 148 | 148 | 148 | 148 |
| Oven 3 | 144 | 144 | 144 | 144 | 144 | 144 |
| Draw Ratio 1 | 1.35 | 1.35 | 1.35 | 1.35 | 1.35 | 1.35 |
| Draw Ratio 2 | 1.30 | 1.30 | 1.30 | 1.30 | 1.0 | 1.30 |
| Draw Ratio 3 | 1.15 | 1.0 | .96 | .90 | 1.0 | 1.0 |
| Total Draw Ratio | 2.02 | 1.755 | 1.685 | 1.58 | 1.35 | 1.755 |
| Tension 1 (g) | 2299 | 2246 | 2200 | 2234 | 2240 | 2242 |
| Tension 2 | 1687 | 1664 | 1570 | 1596 | 1570 | 1658 |
| Tension 3 | 1312 | 360 | 70 | 66 | 31 | 293 |
| Denier | 305.1 | 366.6 | 374.5 | 389.3 | 470.0 | 365.1 |
| Ultim. Elong. (%) | 2.3 | 2.9 | 3.1 | 3.2 | 3.2 | 3.0 |
| Break-load (lb) |  |  |  |  |  |  |
| Straight Break | 21.2 | 26.9 | 26.0 | 23.8 | 32.3 | 26.5 |
| Ovhnd Knot | 8.9 | 9.5 | 9.4 | 7.6 | 10.9 | 8.4 |
| Braid Knot | 17.8 | 19.8 | 20.5 | 19.6 | 21.9 | 18.9 |
| Tenacity (gpd) |  |  |  |  |  |  |
| Straight Break | 31.5 | 33.3 | 31.5 | 27.7 | 31.1 | 32.9 |
| Ovhnd Knot | 13.2 | 11.8 | 11.4 | 8.9 | 10.5 | 10.4 |
| Braid Knot | 26.5 | 24.5 | 24.8 | 22.8 | 21.1 | 23.5 |

Examples 52–58

Examples 52–58 use a single stage of stretch, low draw ratios, and a temperature in the range of 120°–128° C. Example 58 uses two ovens placed in sequence. It is notable that tenacity begins to increase at low draw ratio.

TABLE 16

|  | Ex. 52 | Ex. 53 | Ex. 54 | Ex. 55 | Ex. 56 | Ex. 57 | Ex. 58 |
|---|---|---|---|---|---|---|---|
| Rate (fpm) | 10 | 10 | 10 | 10 | 10 | 10 | 10 |
| Oven 1 (degC) | 120 | 120 | 120 | 120 | 120 | 120 | 120 |
| Oven 2 | — | — | — | — | — | — | 128 |
| Draw Ratio 1 | 1.30 | 1.20 | 1.10 | 1.05 | 1.00 | 1.025 | — |
| Draw Ratio 2 | — | — | — | — | — | — | 1.05 |
| Total Draw Ratio | 1.30 | 1.20 | 1.10 | 1.05 | 1.00 | 1.025 | 1.05 |
| Tension 1 (g) | 3713 | 3250 | 2589 | 1827 | 353 | 1203 | — |
| Tension 2 | — | — | — | — | — | — | 1233 |
| Denier | 522.1 | 560.5 | 590.6 | 618.1 | 639.3 | 627.5 | 604.8 |
| Ultim. Elong. (%) | 3.7 | 3.6 | 3.7 | 3.8 | 4.3 | 4.4 | 3.8 |
| Break-load (lb) | | | | | | | |
| Straight Break | 35.4 | 36.8 | 38.0 | 39.1 | 36.7 | 40.7 | 40.0 |
| Ovhnd Knot | 13.1 | 14.6 | 15.1 | 16.3 | 15.9 | 16.2 | 15.3 |
| Braid Knot | 24.3 | 26.9 | 26.8 | 29.0 | 26.2 | 27.0 | 29.0 |
| Tenacity (gpd) | | | | | | | |
| Straight Break | 30.8 | 29.8 | 29.2 | 28.7 | 26.0 | 29.4 | 30.0 |
| Ovhnd Knot | 11.4 | 11.8 | 11.6 | 12.0 | 11.3 | 11.7 | 11.5 |
| Braid Knot | 21.1 | 21.8 | 20.6 | 21.9 | 18.6 | 19.5 | 21.7 |

Examples 59–64

The following examples show the results of processing braid in a single stage with relatively low draw ratios and a temperature of 110° C. and 115° C.

TABLE 17

|  | Ex. 59 | Ex. 60 | Ex. 61 | Ex. 62 | Ex. 63 | Ex. 64 |
|---|---|---|---|---|---|---|
| Rate (fpm) | 10 | 10 | 10 | 10 | 10 | 10 |
| Oven 1 (degC) | 115 | 115 | 115 | 110 | 110 | 110 |
| Draw Ratio 1 | 1.30 | 1.10 | 1.05 | 1.30 | 1.10 | 1.05 |
| Total Draw Ratio | 1.30 | 1.10 | 1.05 | 1.30 | 1.10 | 1.05 |
| Tension 1 (g) | 3736 | 2711 | 1981 | 4235 | 3308 | 2439 |
| Denier | 558.6 | 583.7 | 606.3 | 584.2 | 580.2 | 601.4 |
| Ultim. Elong. (%) | 3.5 | 3.6 | 3.6 | 3.7 | 3.7 | 3.8 |
| Break-load (lb) | | | | | | |
| Straight Break | 36.9 | 38.9 | 40.4 | 38.4 | 39.8 | 40.4 |
| Ovhnd Knot | 15.0 | 14.1 | 16.6 | 14.7 | 16.0 | 16.7 |
| Braid Knot | 26.3 | 27.0 | 28.3 | 27.3 | 28.8 | 30.0 |
| Tenacity (gpd) | | | | | | |
| Straight Break | 30.0 | 30.2 | 30.2 | 29.8 | 31.1 | 30.5 |
| Ovhnd Knot | 12.2 | 11.0 | 12.4 | 11.4 | 12.5 | 12.6 |
| Braid Knot | 21.4 | 21.0 | 21.2 | 21.2 | 22.5 | 22.6 |

Examples 65–67

The following examples illustrate the use of a single draw stage with a relatively low draw ratio and a temperature of about 125° C.

TABLE 18

|  | Ex. 65 | Ex. 66 | Ex. 67 |
|---|---|---|---|
| Rate (fpm) | 10 | 10 | 10 |
| Oven 1 (degC) | 125 | 125 | 125 |
| Draw Ratio 1 | 1.30 | 1.10 | 1.05 |
| Total Draw Ratio | 1.30 | 1.10 | 1.05 |
| Tension 1 (g) | 2979 | 1967 | 1371 |
| Denier | 499.0 | 569.9 | 597.0 |
| Ultim. Elong. (%) | 3.4 | 3.5 | 3.7 |
| Break-load (lb) | | | |
| Straight Break | 36.6 | 39.0 | 39.7 |
| Ovhnd Knot | 13.1 | 14.6 | 15.8 |
| Braid Knot | 26.6 | 29.4 | 30.2 |
| Tenacity (gpd) | | | |
| Straight Break | 33.0 | 31.0 | 30.1 |
| Ovhnd Knot | 11.9 | 11.6 | 12.0 |
| Braid Knot | 24.2 | 23.4 | 22.9 |

Examples 68–73

These examples used a single draw stage with a relatively low draw ratio and a temperature within 140°–145° C.

TABLE 19

|  | Ex. 68 | Ex. 69 | Ex. 70 | Ex. 71 | Ex. 72 | Ex. 73 |
|---|---|---|---|---|---|---|
| Rate (fpm) | 10 | 10 | 10 | 10 | 10 | 10 |
| Oven 1 (degC) | 140 | 140 | 140 | 140 | 145 | 145 |
| Draw Ratio 1 | 1.00 | 1.05 | 1.10 | 1.30 | 1.30 | 1.10 |
| Total Draw Ratio | 1.00 | 1.05 | 1.10 | 1.30 | 1.30 | 1.10 |
| Tension 1 (g) | 301 | 787 | 1037 | 1634 | 1224 | 775 |
| Denier | 623.5 | 594.0 | 564.5 | 476.4 | 479.8 | 568.9 |
| Ultim. Elong. (%) | 4.5 | 3.6 | 3.5 | 3.3 | 3.1 | 3.4 |
| Break-load (lb) | | | | | | |
| Straight Break | 35.4 | 38.2 | 36.8 | 33.9 | 33.3 | 34.7 |
| Ovhnd Knot | 15.3 | 13.6 | 12.8 | 11.2 | 11.0 | 11.8 |
| Braid Knot | 27.1 | 28.0 | 27.8 | 25.7 | 25.0 | 28.0 |
| Tenacity (gpd) | | | | | | |
| Straight Break | 25.8 | 29.2 | 29.6 | 32.3 | 31.5 | 27.7 |
| Ovhnd Knot | 11.1 | 10.4 | 10.3 | 10.7 | 10.4 | 9.4 |
| Braid Knot | 19.7 | 21.4 | 22.3 | 24.5 | 23.6 | 22.3 |

Examples 74–79

The following are examples of single stage drawing of twisted lines through either one or two 10 ft. Ovens placed end-to-end. Examples 108–110 are with a single 400 d yarn having 10 twists per inch (tpi). Z uptwist. Examples 111–113 are a 2 ply of 100 d yarn. 14.7 tpi Z uptwist. 10.0 tpi S ply.

The examples presented herein are intented for illustration purposes only and are not intended to act as a limitation on the scope of the appended claims.

TABLE 20

|  | Ex. 74 | Ex. 75 | Ex. 76 | Ex. 77 | Ex. 78 | Ex. 79 |
|---|---|---|---|---|---|---|
| Rate (fpm) | 15 | 30 | 30 | 15 | 30 | 30 |
| Oven 1 (degC) | 125 | 140 | 150 | 125 | 140 | 150 |
| Oven 2 | — | 140 | 150 | — | 140 | 150 |
| Draw Ratio 1 | 1.35 | 1.55 | 1.75 | 1.35 | 1.50 | 1.80 |
| Total Draw Ratio | 1.35 | 1.55 | 1.75 | 1.35 | 1.50 | 1.80 |
| Denier | 307.2 | 263.3 | 237.7 | 159.0 | 142.2 | 116.1 |
| Ultim. Elong. (%) | 3.4 | 2.9 | 2.8 | 3.4 | 2.9 | 2.9 |
| Break-load (lb) |  |  |  |  |  |  |
| Straight Break | 11.2 | 19.8 | 18.3 | 11.2 | 11.0 | 9.4 |
| Ovhnd Knot | 8.9 | 8.0 | 7.0 | 5.3 | 4.6 | 3.9 |
| Braid Knot | 15.1 | 13.4 | 13.6 | 8.9 | 8.4 | 7.10 |
| Tenacity (gpd) |  |  |  |  |  |  |
| Straight Break | 32.0 | 34.1 | 34.9 | 32.0 | 35.1 | 36.7 |
| Ovhnd Knot | 13.1 | 13.8 | 13.4 | 15.1 | 14.7 | 15.2 |
| Braid Knot | 22.3 | 23.1 | 26.0 | 25.4 | 26.8 | 27.7 |

I claim:

1. A process for increasing tenacity in a twisted or braided fishing line made of gel spun polyolefin yarns. said process comprising
stretching a braided or twisted line of 3–64 gel spun polyolefin yarns, wherein each yarn is within the range from about 20 denier to about 1000 denier, at a temperature within the range from about 110° C. to about 150° C. and at a total draw ratio within the range from about 1.0 to about 2.0.

2. A process according to claim 1 wherein said stretching comprises stretching said line in at least two draw stations.

3. A process according to claim 1 wherein said stretching comprises
stretching said line in three draw stations.

4. A process according to claim 1 wherein said stretching comprises
stretching said line at a total draw ratio within the range from about 1.05 to about 1.5.

5. A process according to claim 4 wherein said stretching comprises
stretching said line at a total draw ratio within the range from about 1.1 to about 1.4.

6. A process according to claim 5 wherein said stretching comprises
stretching said line at a total draw ratio within the range from about 1.15 to about 1.35.

7. A process according to claim 1 wherein said stretching process comprises stretching a braided line made from yarns containing gel spun polyethylene.

8. A process according to claim 1 wherein said stretching process comprises stretching a twisted line made from yarns containing gel spun polyethylene.

9. A process according to claim 1 further comprising:
adding color to said line by coating the line with a mineral oil containing a dye or pigment before the stretching step.

10. A process according to claim 1 further comprising:
adding color to said line by coating the line with a copolymer of ethylene-acrylic acid containing a dye or pigment before the stretching step.

11. A process according to claim 1 wherein said line is stretched at a temperature within the range of 110°–115° C. at a total draw ratio within the range of 1.05–1.3.

12. A process according to claim 1 wherein said line is stretched at a temperature within the range of 120°–128° C. at a total draw ratio within the range of 1.00–1.30.

13. A process according to claim 1 wherein said line is stretched at a total draw ratio within the range of 1.025–1.3.

14. A process according to claim 1 wherein said line is stretched at a temperature within the range of 140°–145° C. at a total draw ratio within the range of 1.00–1.30.

15. A process according to claim 1 further comprising:
passing the stretched line through an oven at a temperature within the range of 140°–145° C. at a total draw ratio within the range of 1.00–1.30.

16. A braided fishing line made from gel spun polyolefin yarns made by a process comprising
stretching a braided line of 3–64 gel spun polyolefin filament yarns wherein each yarn is within the range from about 20 denier to about 1000 denier under tension at a temperature within the range from about 110° C. to about 150° C. and at a total draw ratio within the range from about 1.0 to about 1.4.

17. A line according to claim 16 wherein said line has been stretched at a temperature within the range from about 1100° C. to about 150° C. and at a total draw ratio within the range from about 1.1 to about 1.35.

18. A line according to claim 16 wherein said line has been stretched at a temperature within the range from about 110° C. to about 150° C. and at a total draw ratio within the range from about 1.15 to about 1.35.

19. A line according to claim 16 herein said line has been stretched at a temperature within the range of 110°–115° C. at a total draw ratio within the range of 1.05–1.3.

20. A line according to claim 16 wherein said line has been stretched at a temperature within the range of 120°–128° C. at a total draw ratio within the range of 1.00–1.30.

21. A line according to claim 20 wherein said line has been stretched at a total draw ratio within the range of 1.025–1.3.

22. A line according to claim 16 wherein said line has been stretched at a temperature within the range of 140°–145° C. at a total draw ratio within the range of 1.00–1.30.

23. A line according to claim 16 wherein the stretched line has been further treated by passing the stretched line through an oven at a temperature within the range of 140°–148° C. at a draw ratio within the range of 0.9–1.0.

24. A line according to claim 16 wherein color has been imparted to said line by coating the braided line with a mineral oil containing a dye or pigment before said stretching step.

25. A line according to claim 16 wherein color has been imparted to said line by coating the braided line with an ethylene-acrylic acid copolymer containing a dye or pigment before said stretching step.

26. A line according to claim 16 that has been stretched in a single draw station.

27. A twisted fishing line made from gel spun polyolefin yarns made by a process comprising:
stretching a twisted line of 3–64 gel spun polyolefin filament yarns wherein each yarn is within the range from about 20 denier to about 1000 denier under tension at a temperature within the range from about 110° C. to about 150° C. and at a total draw ratio within the range from about 1.0 to about 1.4.

28. A line according to claim 27 wherein said line has been stretched at a temperature within the range from about 110° C. to about 150° C. and at a total draw ratio within the range from about 1.1 to about 1.35.

29. A line according to claim 27 wherein said line has been stretched at a temperature within the range from about 110° C. to about 150° C. and at a total draw ratio within the range from about 1.15 to about 1.35.

30. A line according to claim 27 wherein said line has been stretched at a temperature within the range of 110°–115° C. at a total draw ratio within the range of 1.05–1.3.

31. A line according to claim 27 wherein said line has been stretched at a temperature within the range of 120°–1280 C. at a total draw ratio within the range of 1.00–1.30.

32. A line according to claim 31 wherein said line has been stretched at a total draw ratio within the range of 1.025–1.3.

33. A line according to claim 27 wherein said line has been stretched at a temperature within the range of 140°–145° C. at a total draw ratio within the range of 1.00–1.30.

34. A line according to claim 27 wherein the stretched line has been further treated by passing the stretched line through an oven at a temperature within the range of 140°–148° C. at a draw ratio within the range of 0.9–1.0.

35. A line according to claim 27 wherein color has been imparted to said line by coating the twisted line with a mineral oil containing a dye or pigment before said stretching step.

36. A line according to claim 27 wherein color has been imparted to said line by coating the twisted line with an ethylene-acrylic acid copolymer containing a dye or pigment before said stretching step.

37. A line according to claim 27 that has been stretched in a single draw station.

38. A process for making a fishing line made of gel spun polyolefin yarns, said process comprising:

stretching a braided or twisted line of gel spun polyolefin yarns, wherein each yarn is within the range from about 20 denier to about 1000 denier, at a temperature within the range from about 110° C. to about 150° C. and at a total draw ratio within the range from about 1.0 to about 2.0; and passing the stretched line through an oven at a temperature within the range of 140°–148° C. at a draw ratio within the range of 0.9–1.0.

39. A process according to claim 38 wherein said line is stretched at a temperature within the range of 110°–115° C. at a total draw ratio within the range of 1.05–1.3.

40. A process according to claim 38 wherein said line is stretched at a temperature within the range of 120°–128° C. at a total draw ratio within the range of 1.00–1.30.

41. A process according to claim 38 wherein said line is stretched at a total draw ratio within the range of 1.025–1.3.

42. A process according to claim 38 further comprising:
adding color to said line by coating the line with a copolymer of ethylene-acrylic acid containing a dye or pigment before the stretching step.

43. A process according to claim 38 further comprising:
adding color to said line by coating the line with a mineral oil containing a dye or pigment before the stretching step.

* * * * *